US005221381A

United States Patent [19]

Hurrell, II

[11] Patent Number: 5,221,381

[45] Date of Patent: * Jun. 22, 1993

[54] VEHICLE TIRE PRESSURE MANAGEMENT SYSTEM WITH EASILY REMOVED WHEEL AND TIRE

[75] Inventor: George L. Hurrell, II, Port Clinton, Ohio

[73] Assignee: General Motors Corporation, Detroit, Mich.

[ * ] Notice: The portion of the term of this patent subsequent to Jun. 12, 2007 has been disclaimed.

[21] Appl. No.: 372,510

[22] Filed: Jun. 28, 1989

[51] Int. Cl.⁵ ............ B60C 23/00

[52] U.S. Cl. ............ 152/416; 152/427

[58] Field of Search ............ 152/415, 416, 417, 427

[56] References Cited

U.S. PATENT DOCUMENTS

| | | | |
|---|---|---|---|
| 1,083,847 | 1/1914 | McDowell | 152/417 |
| 1,112,596 | 10/1914 | Burggraf | 152/417 |
| 1,904,073 | 4/1933 | O'Connor | 152/417 |
| 4,431,043 | 2/1984 | Goodell et al. | 152/417 |
| 4,470,506 | 9/1984 | Goodell et al. | 152/417 |
| 4,498,709 | 2/1985 | Wells et al. | 152/417 |
| 4,582,107 | 4/1986 | Scully | 152/417 |
| 4,619,137 | 10/1986 | Bott | 301/6 WB |
| 4,832,651 | 5/1989 | Buck | 152/427 |
| 4,932,451 | 6/1990 | Williams et al. | 152/417 |

FOREIGN PATENT DOCUMENTS

| | | | |
|---|---|---|---|
| 0172003 | 7/1989 | Japan | 152/415 |

OTHER PUBLICATIONS

"Webster's New World Pictionary, Third College Edition", Simon and Shuster, 1988, p. 1106.

*Primary Examiner*—Michael W. Ball
*Assistant Examiner*—Francis J. Lorin
*Attorney, Agent, or Firm*—Patrick M. Griffin

[57] ABSTRACT

A disk type wheel has integrally formed air passages that open to the tire and through a central, closed bottom hub. Pressurized air is supplied axially through the bearing to an outlet surrounded by a mounting boss of the wheel bearing. When the wheel is added in conventional fashion to the boss, the central hub forms an air plenum in cooperation with the boss.

1 Claim, 2 Drawing Sheets 48 46 50 44 66 60 62 52 40 32 20 58 54 56 68 42 36 24 10 16 12 26 28 14 30 18 34 72 38 64 70 22

VEHICLE TIRE PRESSURE MANAGEMENT SYSTEM WITH EASILY REMOVED WHEEL AND TIRE

This invention relates to vehicle tire pressure management systems in general, and specifically to such a system with an easily removed wheel and tire.

BACKGROUND OF THE INVENTION

Active vehicle tire pressure management systems provide pressurized make up air to the tire, rather than just monitoring the tire pressure. Pressurized air so provided from a pump or other source must be ducted to the tire somehow, but the tire must still be removable for changing. Known systems generally have a rather complex system of hosing, connectors and other hardware that must be disconnected to remove the tire, meaning that the process is significantly more difficult than changing an ordinary tire.

SUMMARY OF THE INVENTION

The invention provides a wheel and tire for use in a vehicle tire pressure management system that may be removed as easily as a conventional wheel and tire. In the embodiment disclosed, a wheel bearing has a cylindrical wheel mounting boss located axially outboard of the bearing. A central bore through the spindle of the bearing supplies pressurized air axially through the bearing to an outlet that is surrounded by the cylindrical boss.

A disk type wheel has a cylindrical, closed bottom hub that slides closely over the bearing boss so as to form a pressurized air plenum. A web extends radially out from the wheel hub to a bead seat. Formed integrally with the web is an air passage that opens into both the plenum and through the bead seat. A conventional tire is mounted to the bead seat. The air path to the tire is thus complete, but the tire can be changed simply by demounting the wheel hub from the boss, like a conventional tire and wheel. In addition, in the the embodiment disclosed, the hub wall is cored out to receive an air control valve.

It is, therefore, an object of the invention to provide a vehicle tire pressure management system in which the wheel and tire may be removed as easily as a conventional wheel.

It is another object of the invention to provide such a system by ducting air centrally through a bearing and through a tire mounting boss located axially outboard of the bearing, and providing the wheel with a closed bottom wheel hub and integral air passage that cooperate with said bearing boss to complete the air passage to the tire when the wheel is mounted in conventional fashion.

It is another object of the invention to provide an easily removed wheel and tire for use with a vehicle tire pressure management system having a wheel bearing with an outboard wheel mounting boss and a supply of pressurized air ducted axially through said bearing and boss.

DESCRIPTION OF THE PREFERRED EMBODIMENT

These and other objects and features of the invention will appear from the following written description, and from the drawings, in which.

Figure 1:
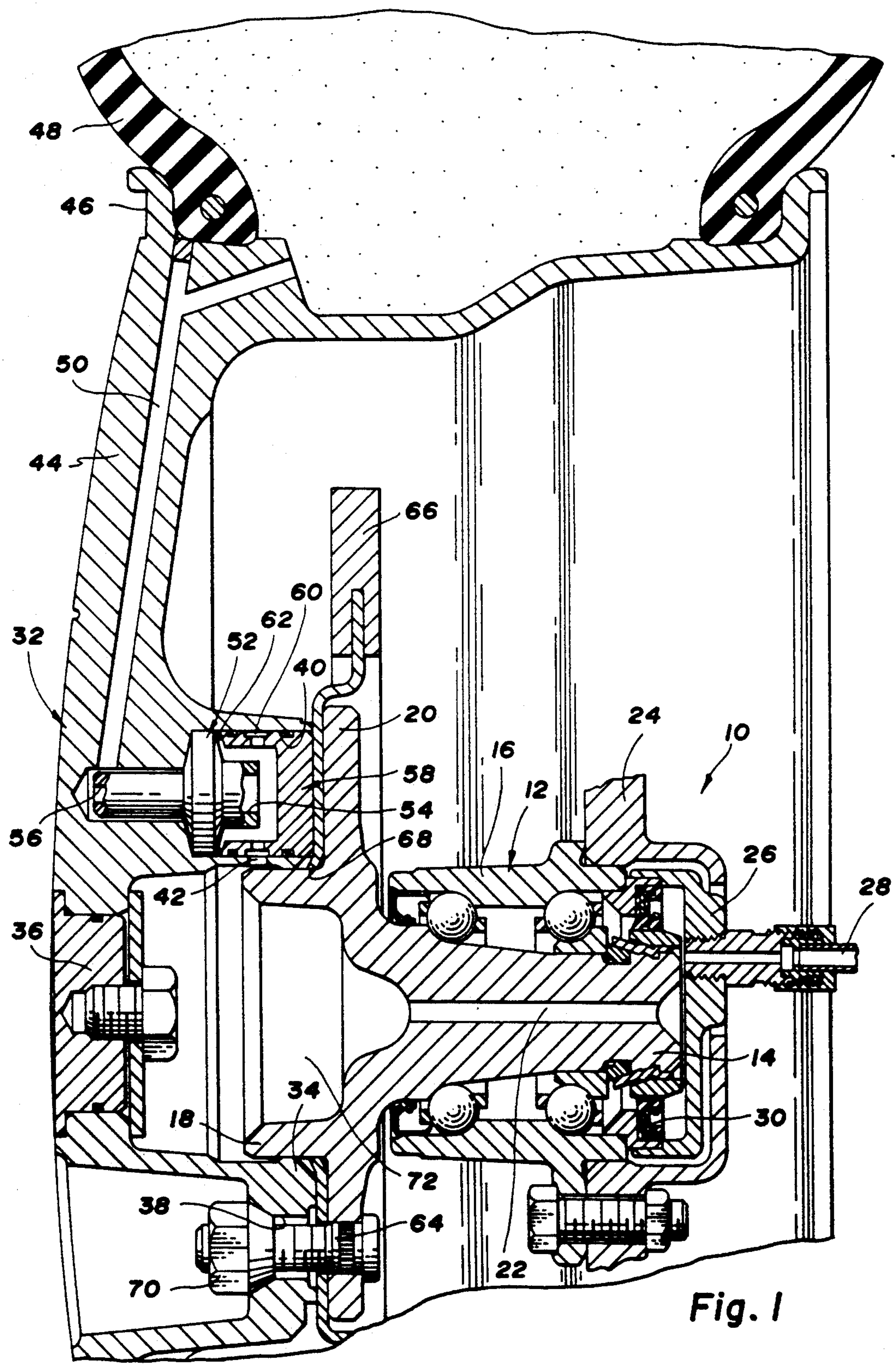
FIG. 1 is a cross sectional view of a preferred embodiment of the invention assembled to the bearing.

Referring to the drawings, a vehicle tire pressure management system, indicated generally at 10, includes a pump or other conventional source of pressurized air, which is not illustrated. A spindle type wheel bearing, indicated generally at 12, includes a central wheel spindle 14, rotatably supported coaxially within an outer race 16. Spindle 14 has a cylindrical wall wheel mounting boss 18 located axially outboard, the outer surface of which is machined substantially smooth. A radial wheel mounting flange 20 is just inboard of boss 18. While boss 18 is strong enough to support a wheel, it need not be solid all the way across, and is generally open in the center, as shown, to save weight and material. Drilled centrally down spindle 14 is an axial air passage 22, the outlet of which is therefore surrounded by boss 18. Axially inboard, outer race 16 is bolted to a relieved portion of a vehicle suspension 24, and is stationary. Wheel spindle 14, of course, rotates rapidly. A sealing dust cap 26 is tightly received into outer race 16, and cap 26 has an inlet hose 28 threaded through it. Hose 28 runs to the non illustrated air pressure supply source. A heavy duty inboard bearing seal 30 provides lubricant retention for bearing 12, and also cooperates with dust cap 26 to form an airtight chamber, so that air from inlet hose 28 will be forced down axial air passage 22.

Figure 2:
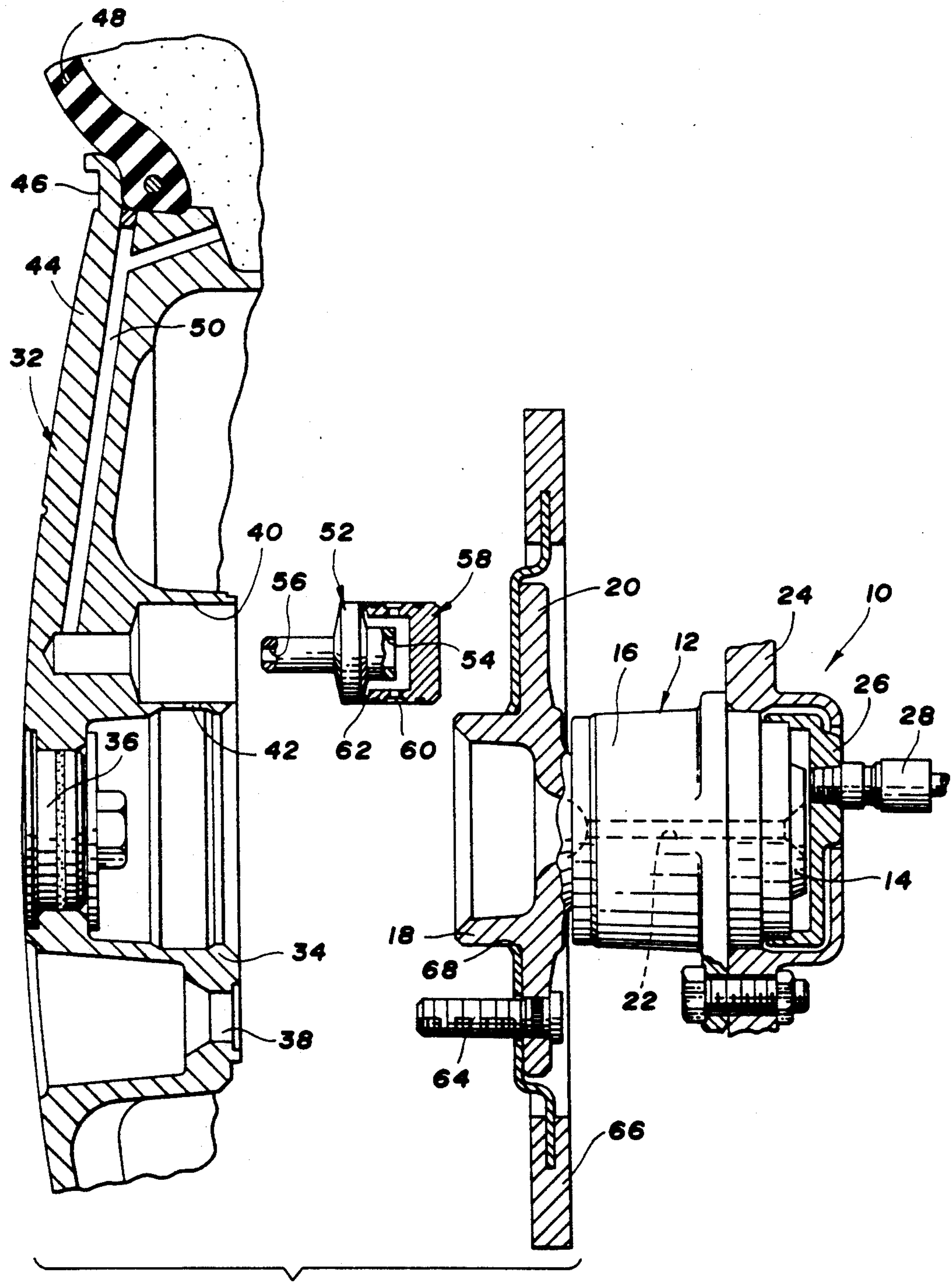
FIG. 2 is a view of the components axially exploded, with the bearing shown partially in elevation.

Referring next to FIG. 2, a disk type wheel, indicated generally at 32, is conventional in size, shape and material, being cast of a suitable alloy. Wheel 32 has a central cylindrical hub 34, which has an inner diameter sized to make a close slip fit over the smooth outer surface of wheel mounting boss 18, as is conventional. Hub 34 is closed bottomed, which is accomplished in the embodiment disclosed by an airtight plug 36, since wheel 32 is adapted from a wheel design with an open hub. The wall thickness of hub 34 is sufficient to have several conventional mounting holes 38 bored therethrough, as well as a valve chamber 40. Valve chamber 40 has a stepped cylindrical shape, parallel to hub 34, with an inlet hole 42 drilled through its inner surface and through hub 34. Wheel 32 also has a disk shaped web 44 extending radially out from hub 34 to a conventional bead seat 46. A tire 48 is mounted to bead seat 46. A radial air passage 50 is formed integrally in web 44, by drilling in this case, and opens between valve chamber 40 and bead seat 46. A control valve, indicated generally at 52, is made of a lightweight aluminum or alloy material, similar to the material of wheel 32, and is sized to fit closely in valve chamber 40. The working internal details of valve 52 are not crucial to an explanation of the invention here. In general, valve 52 has a supply inlet 54 at one end, a tire outlet 56 at the other end normally closed from inlet 54, and will open when a sufficient signal pressure is seen at the inlet 54. That signal pressure would be supplied automatically in response to a low tire pressure condition, or manually by an operator. Valve 52 closes quickly to seal air loss from tire 48 when the signal pressure is removed. A spacer plug, indicated generally at 58, is sized to fit closely in the end of valve chamber 40, and has an apertured peripheral groove 60 aligned with valve chamber inlet 42. An O ring 62 is located between plug 58 and valve 52, for a purpose described next.

Referring next to FIGS. 1 and 2, before wheel 32 is installed, valve 52 and spacer plug 58 are seated in valve chamber 40. Since valve 52 is adapted from another application, spacer plug 58 is needed to keep it seated in place. Plug 58 fits tightly enough within valve chamber 40 to substantially seal the supply inlet 54 from atmosphere. More importantly, the O ring 62 provides a tight seal of tire outlet 56 from atmosphere. The weight of valve 52 and plug 58 together would substantially equal the material removed out of wheel 32 when valve chamber 40 and radial passage 50 are formed. Any weight differential would be compensated for with appropriate balance weights. The potential centrifugal imbalance caused by valve 52 is also minimized by its location radially near the center of wheel 32. To install wheel 32, conventional wheel studs 64 are fixed to spindle mounting flange 20, and a conventional brake rotor 66 is press fitted over the outer surface bearing wheel boss 18 and abutted with spindle mounting flange 20. The juncture of rotor 66 and boss 18, best seen at 68 in FIG. 2, may have a bead of sealant or a large O ring added, if desired. Finally, the wheel hub 34 is slid over boss 18, and wheel 32 fixed in place with conventional lug nuts 70, as would a typical wheel. Plug 58 is held in securely by its abutment with rotor 66, and O ring 62 is tightly compressed. Adding wheel 32 creates a plenum 72, cooperatively formed by closed bottom wheel hub 34 and wheel mounting boss 18. Since the outlet of axial air passage 22 is surrounded by boss 18, plenum 72 receives pressurized air from axial air passage 22. Plenum 72 is substantially sealed from atmosphere just by the close fit of hub 34 over boss 18, but that seal can be enhanced with sealant at 68, as noted. Some leakage from plenum 72 can be tolerated at the juncture 68, however, since tire 48 is tightly sealed from atmosphere by the internal seal of the valve 52, and by the compressed O ring 62. Any small loss from plenum 72 is more than made up for by the ease of adding and removing wheel 32 and tire 48, which is accomplished just like a conventional wheel and tire, simply by sliding hub 34 on and off of boss 18.

Variations of the preferred embodiment may be made. Valve 52 could be installed through bead seat 46, but its radially inboard location minimizes its centrifugal effect of wheel 32. Valve 52 could also be placed in hub plug 36, dead center to wheel 32, with no centrifugal effect. However, the embodiment shown would be as readily usable with a driven wheel, where a splined shaft extended centrally through bearing 14, and was retained to the bearing inner race with a nut to which central access had to be provided. Radial air passage 50 could be made integral to wheel 32 in some other way, as by being cast in place, or just provided as a tube welded to or inserted in the web 44. Either way, it would come off with wheel 32, with no additional disassembly operations needed. Therefore, it will be understood that the invention is not intended to be limited to just the embodiment disclosed.

The embodiments of the invention in which an exclusive property or privilege is claimed are defined as follows:

1. A tire pressure management system for a vehicle with a tire providing for easy removal of said tire, comprising, a wheel bearing having an outer race and a spindle, said spindle further having a wheel mounting boss at an axially outboard end thereof supply means bringing pressurized air axially through said spindle to an outlet surrounded by said bearing wheel mounting boss, a disk wheel having a closed central hub adapted to axially slide closely over said wheel mounting boss, thereby creating a plenum that receives pressurized air from said outlet, said wheel also having a web extending radially out from said central hub to a bead seat and an integral air passage associated with said wheel web and opening into both said plenum and through said bead seat, a tire mounted to said bead seat, whereby, said tire and wheel may be removed simply by sliding said wheel hub off of said wheel mounting boss.

* * * * *